Figure 1:
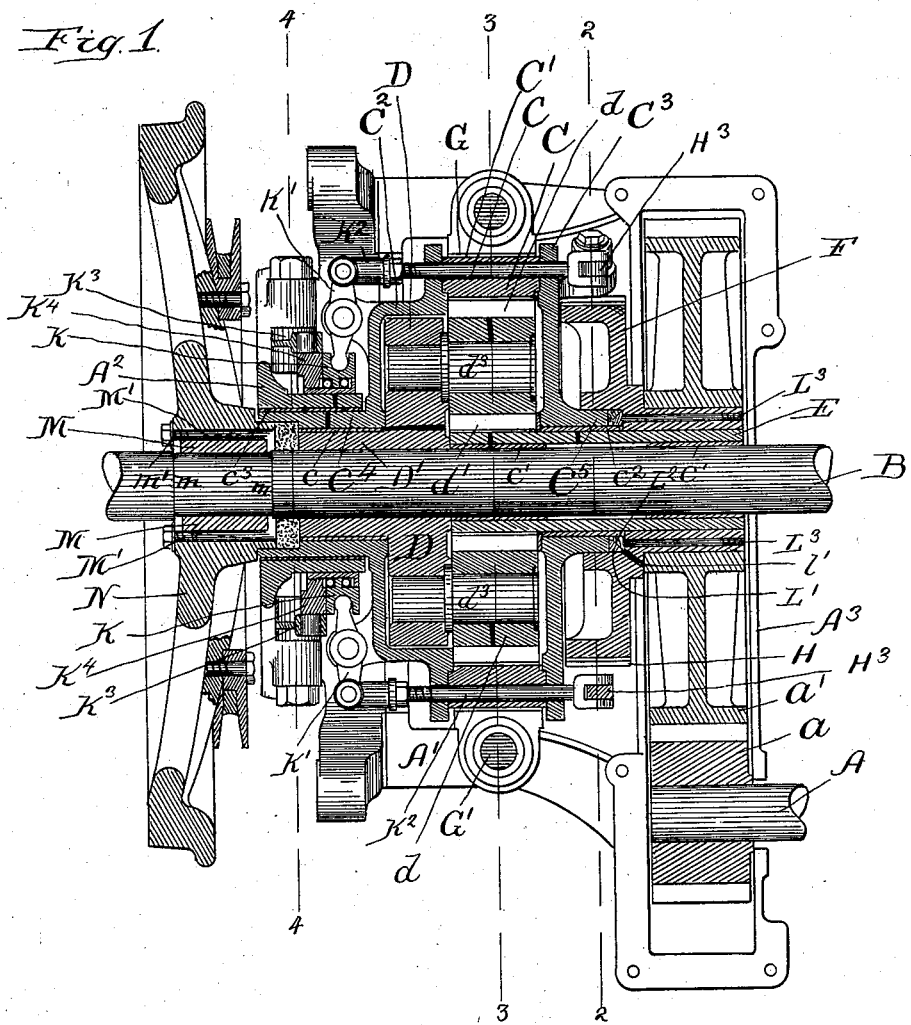

(No Model.) 4 Sheets—Sheet 1.
H. P. BROWN.
PLANET GEAR MOTION TRANSMITTING AND SPEED VARYING MECHANISM.
No. 603,253. Patented May 3, 1898.

Witnesses:
Geo. E. Curtis
H. W. Munday

Inventor:
Harold P. Brown
By Munday, Evarts & Adcock
His Attorneys.

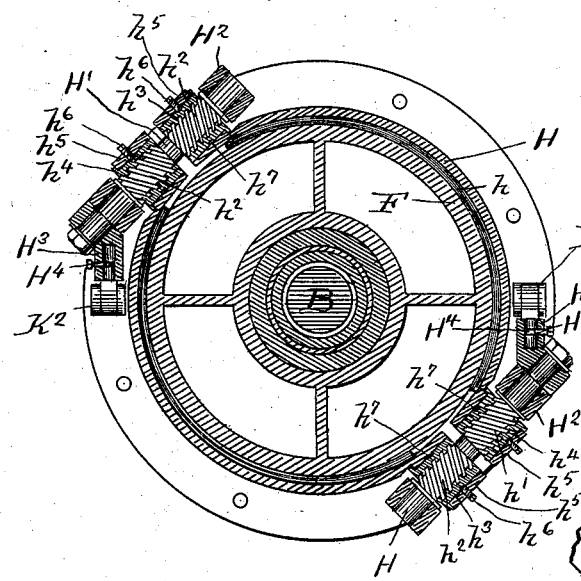
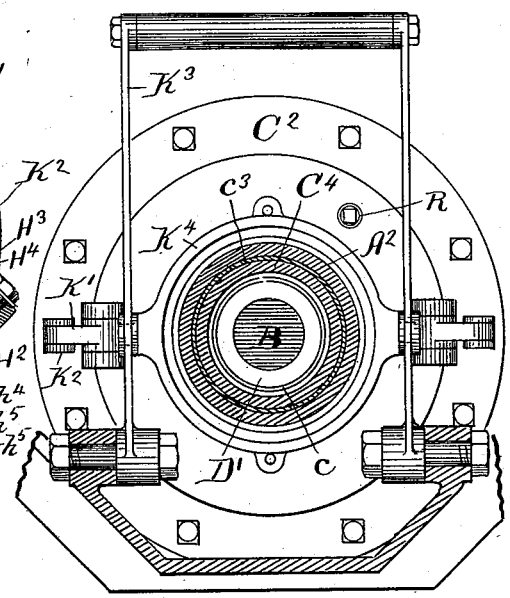
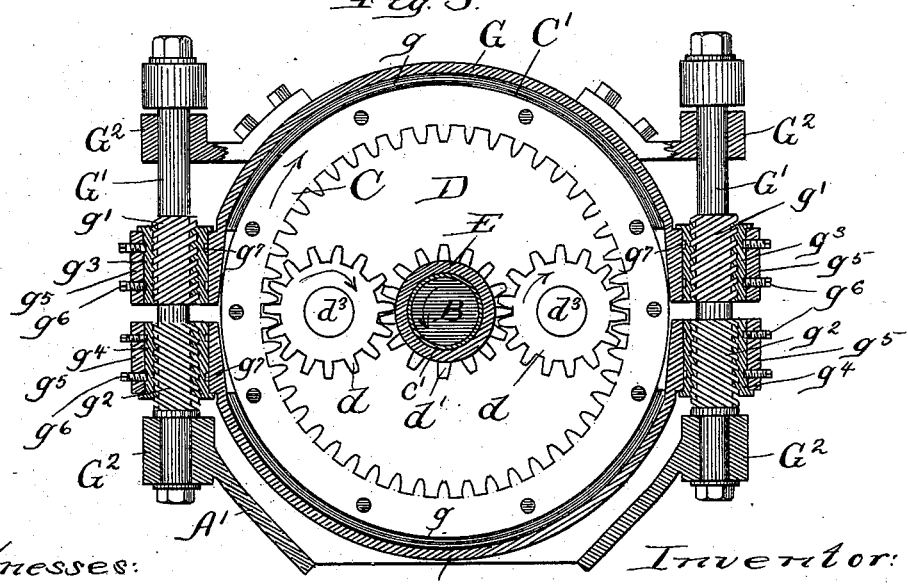

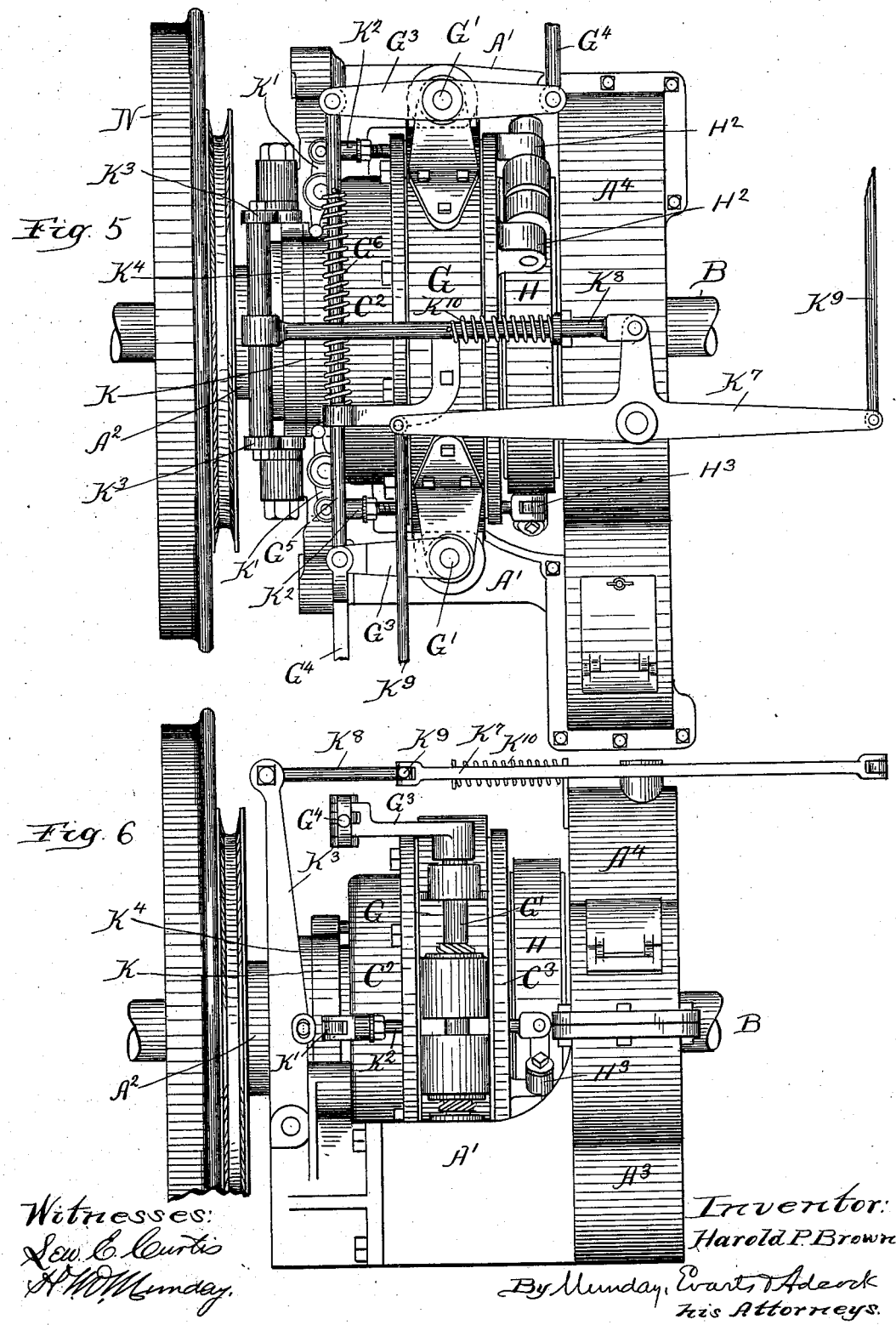

(No Model.) 4 Sheets—Sheet 4.
H. P. BROWN.
PLANET GEAR MOTION TRANSMITTING AND SPEED VARYING MECHANISM.
No. 603,253. Patented May 3, 1898.
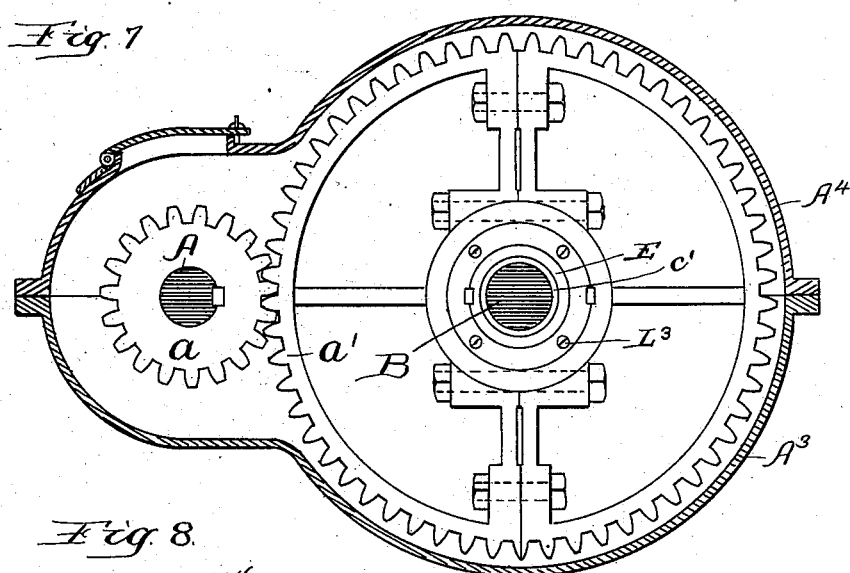
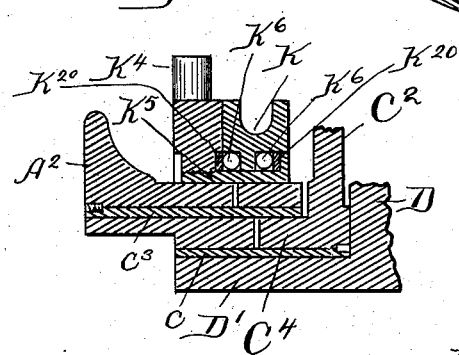
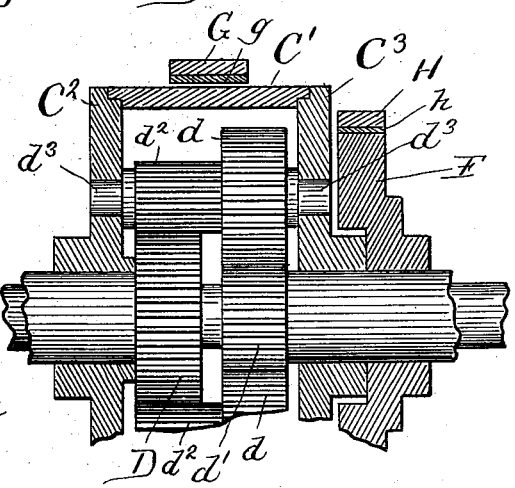
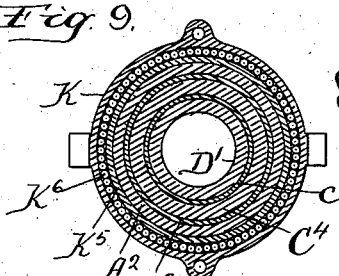
Witnesses:
Lew. E. Curtis
H. W. Munday
Inventor:
Harold P. Brown
By Munday, Evarts & Adcock
His Attorneys.

UNITED STATES PATENT OFFICE.

HAROLD P. BROWN, OF NEW YORK, N. Y.

PLANET-GEAR MOTION-TRANSMITTING AND SPEED-VARYING MECHANISM.

SPECIFICATION forming part of Letters Patent No. 603,253, dated May 3, 1898.

Application filed March 11, 1893. Serial No. 465,629. (No model.)

*To all whom it may concern:*

Be it known that I, HAROLD P. BROWN, a citizen of the United States, residing in New York, in the county of New York and State of New York, have invented a new and useful Improvement in Planet-Gear Motion-Transmitting and Speed-Varying Mechanism, of which the following is a specification.

My invention relates to planet-gear mechanism for transmitting power from one revolving device to another and varying the speed of the driven device at will.

My invention consists, in connection with an internal gear and a friction-brake mounted upon the frame and adapted to be applied to said gear, of a revolving planet-gear-carrying disk secured to the shaft to be driven and carrying planet-gears which mesh with the internal gear and a supplemental friction wheel or disk connected with the driving-wheel or source of power, a supplemental friction device adapted to be applied to said supplemental friction wheel or disk, and which supplemental friction device is mounted upon or is carried by the internal gear or parts connected therewith. The supplemental friction mechanism thus revolves with the internal gear.

The invention further consists, in connection with these parts, of mechanism for operating this revolving supplemental friction device.

The invention further consists in the novel devices and novel combinations of parts and devices herein shown and described, and more particularly pointed out in the claims.

By combining with the internal-gear and the planet-gear disk two friction-wheels, one attached to or formed integral with the internal gear and the other separate and distinct therefrom, and two friction devices, one a stationary brake device and mounted upon the frame and the other a revolving friction device mounted upon the internal gear, I am enabled to vary or reduce the speed several times without permitting either of the friction-wheels to slip against its brake or friction device, according as the one or the other is firmly set against its friction-wheel, the other being loose, and by applying the one friction device or the other with greater or less force, so that the friction-wheel slips on the friction device more or less, the speed may be varied, as desired, from zero up to the full speed of the machine. It will be observed that whichever friction device is applied gradually the load is always started at a double reduction.

In the accompanying drawings, which form a part of this specification, and in which similar letters of reference indicate like parts throughout the several views, Figure 1 is a central sectional view of a device embodying my invention. Fig. 2 is a cross-section on line 2 2 of Fig. 1. Fig. 3 is a cross-section on line 3 3 of Fig. 1. Fig. 4 is a cross-section on line 4 4 of Fig. 1. Fig. 5 is a plan view of the device, and Fig. 6 an elevation of the same. Fig. 7 is a section on line 7 7 of Fig. 5. Figs. 8 and 9 are detail sections, and Fig. 10 shows a modification of the gear.

In the drawings, A represents the driving-shaft, and B the driven shaft, to which motion is to be communicated and the speed of which is to be varied.

C is the internal-gear wheel.

D is the pinion-disk, carrying the planet-gears $d$ $d$, journaled on the studs $d^3$, and which mesh with the internal gear C and revolve around the gear $d'$, which is secured to or formed integral with a sleeve E, loose on the shaft B.

F is the supplemental friction wheel or disk, likewise keyed or secured to the sleeve E. The internal gear C is loose upon the sleeve E. The pinion-disk or planet-gear disk D is secured fast to the shaft B.

G is a friction-brake consisting, preferably, of a band encircling the outer or friction-brake surface C' of the internal gear C. This brake G is mounted upon the stationary frame A' of the machine.

H is the revolving or supplemental friction device, which is applied to the supplemental friction-wheel F, and which is mounted upon or revolves with the internal gear C or the parts connected therewith. On the driving-shaft A is a gear $a$, which meshes with a gear $a'$, keyed to the sleeve E.

The internal gear C has a hollow shell $C^2$, which incloses the pinion-disk D and its pinions $d$ and a shell $C^3$, each of which is provided with bearing sleeves or hubs $C^4$ $C^5$, one of which fits upon the sleeve E and the other upon the sleeve or hub D' of the disk D. The sides of internal gear C are provided with grooves to engage projecting tongues on shells C² C³, or vice versa, to accurately center the three, to partially relieve the assembling-bolts of shearing strains, and to secure oil-tight joints. Bushings $c\ c^2$, preferably of bronze, are interposed between the bearing-surfaces of the sleeve E, hub D', and the bearing-surfaces C⁴ C⁵ of the internal gear C. Similar bronze bushings $c'\ c'$ are interposed between the shaft B and the inner periphery of the sleeve E, and like bushings $c^3$ are interposed between the bearing C⁴ and the bearing A² of the frame. The brake G preferably consists of two half-circular bands of metal furnished with a lining $g$, of vulcanized fiber or other friction material, the two halves of which are adapted to be placed or set together by a pair of screws G' G', having each right and left hand threads $g'\ g^2$, working in nuts $g^3\ g^4$, fixed in the sleeves $g^5\ g^5$ at each extremity of the semicircular bands G G.

The material known as "vulcanized fiber" is exceedingly well adapted for use as a friction lining, since it acquires a glossy surface, is a poor conductor of heat, has a high coefficient of friction in contact with cast-iron, and retains the same, even when its surface is partly carbonized. To secure good service from this material, it is important to keep its wearing-surface free from lubrication.

The screws G' are journaled in suitable bearings G², secured to the band G G or to the surrounding frame. The adjustable right and left threaded nuts $g^3\ g^4$ are fixed in place by set-screws $g^6$. By loosening these set-screws and turning the nuts on the screw the position of the nuts in respect to the screw may be adjusted so that the movement of the operating-lever will properly apply the brake-band to the brake-wheel. Grooves $g^7$ are cut in the nuts $g^3$, so that the setting up of set-screws $g^6$ will not deface the outer surfaces of the nuts $g^3$ and prevent their being moved when desired. The other friction device or band H for the supplemental friction-wheel F is or may be of similar construction and its corresponding parts are designated by reference-letters H' H² H³ $h\ h'\ h^2\ h^3\ h^4\ h^5\ h^6\ h^7$, respectively. As the friction-band H H is carried by or mounted upon the internal gear C or its shell C² and revolves therewith the operating-levers H³ for the screws H' of said friction-band are operated through the medium of a sliding collar K on the sleeve A², which is connected by the pivoted levers K' to the operating arms or levers H³ through the pivoted connecting-links K², and to prevent the operating arms or levers H³ from binding they are furnished with knuckle-joints H⁴. The sliding collar K is operated by a brake-lever K³. The brake-lever K³ is connected to the collar K by a flanged sleeve K⁴, screw-threaded to the collar K⁵, which sleeve is furnished with two sets of ball or antifriction bearings K⁶ K⁶, one on each side of the collar K, so as to relieve the revolving collar K from friction with the non-revolving collar K⁵ of the operating-lever. The balls roll on hardened-steel rings K²⁰, which can be replaced when necessary.

It will be observed that in my present improvement the friction-brake G is applied to the internal-gear wheel C instead of to the planet-gear-carrying disk D, as is done in my Patent No. 449,752 and in my pending application, Serial No. 415,685. An important and material improvement is effected by this change, as I thus accomplish the new result of reducing the speed of the driven shaft B from that of the driving-sleeve E in the proportion of four to one, when the gears $d$ and $d'$ are of the same size, because the planet-gears are thus carried around the internal gear C in the direction of its revolution, thus causing one revolution to be lost at each turn, whereas by the manner in which the parts are combined, as shown in my former patent and application above referred to, the reduction of speed is only in the proportion of three to one. By this new combination of the parts together I also secure the important result of causing the planet-gears $d\ d$ to revolve at the slowest speed when doing the heaviest work— that is to say, when the friction-brake G is applied with the most force—and to revolve at the swifter speed when doing the lightest work—that is to say, when the friction-brake G is applied with little or no force—whereas by the old construction of these parts, as shown and described in my former patent and application above referred to, the planet-gears $d\ d$ were caused to revolve at the swiftest speed when subjected to the heaviest work or load. By the new combination the wear is materially reduced and the mechanism runs lighter and is rendered more durable.

It will be understood by those skilled in the art that this feature of my present improvement may be employed either in connection with or without the double-reduction feature first above described, and which involves the use of two independent friction-brakes F and G, the friction device F to effect a single reduction of speed and the brake G to effect a further or double reduction of speed, according as the one or the other is applied.

The operation of the device is as follows: When neither brake G nor friction device H is applied and the driving-shaft A is in motion, its gear $a$ will turn the gear $a'$ in the opposite direction—say to the left. As $a'$ is keyed to the sleeve E, which is integral with pinion $d'$, the latter will revolve pinions $d$ to the right at the same speed and they will turn internal gear C to the right at one-third the speed of pinion $d'$. If now the stationary brake G be applied with a slight pressure, the movement of internal gear C to the right will be checked somewhat and pinion-disk D will be slowly turned to the left, the speed of D and the power delivered to it being proportional to the speed of $d$ and the brake-presure on C. It will therefore be observed that this device acts not as a simple clutch. When sufficient pressure is applied to the brake G to entirely check the motion of internal gear C to the right, the pinion-disk D will be turned to the left at one-quarter the speed of pinion $d'$, and it will carry the shaft B with it. There is now a double reduction of speed (of, say, thirteen and one-half to one) between shaft A and shaft B, and the pinions $d$ will revolve at one-half their speed when idle. When the shaft A is in motion, as before, and the single-reduction friction device H is applied with a slight pressure, the movement of internal gear C to the right is checked and pinion-disk D and axle B are turned to the left with a speed and amount of power proportional to the speed and pressure of the friction device H and the friction-wheel F. If the pressure on the friction device H be gradually increased until the backward movement of internal gear C is checked, B is again driven at one-quarter the speed of $d'$, and there is the same double reduction as before between shaft A and shaft B. If the pressure on friction device H be still further increased, internal gear C will begin to move to the left, thereby reducing the speed of gears $d$ and increasing the speed of pinion-disk D and shaft B. If sufficient pressure be now applied, the friction device H will lock the friction-wheel F. The internal gear will now rotate at the same speed as the pinion $d'$ and the axle B, and the pinions $d$ will no longer rotate on their axes. We now have a single reduction between A and D of, say, three and one-half to one. With this device all ratios of reduction from nothing up to thirteen and one-half to one can be smoothly obtained with the double-reduction brake G, and all ratios from nothing to three and one-half to one with the single-reduction friction device H. This is therefore well adapted for use on a railway motor-car where great power at slow speed is necessary for starting. It is evident that by making the gear $d'$ smaller or larger than the gears $d$ the ratio of reduction can be varied as desired, or the sleeve E may be directly driven, as by the armature of an electric motor, thus giving either a single reduction of zero up to four to one, or of zero up to one to one. Another advantage of this device is in its use as a brake. If when the mechanism, as shown in Fig. 1, is under full headway at a single reduction of, say, three and one-half to one, it is desired to check the speed, the friction device H is released and the brake G applied. The momentum of the moving parts would at once tend to drive shaft A at four times its former or normal speed with a ratio of one to thirteen and one-half. The mere mechanical work in so driving A is sufficient to soon bring the speed of B down to its normal speed when at a double reduction; but if the shaft A is attached to an electric motor the latter may be so arranged—as, for instance, by providing it with shunt field-magnets—that the momentum of B when under full headway will, in driving A at more than its normal speed, convert the motor into a dynamo, and thus change the momentum of the moving mass into electricity, which can be used elsewhere as power, or if a pneumatic motor is used its higher speed than normal may cause the driving-cylinder to pump air back into the reservoir. This is a practical result never before accomplished by mechanical means. In order to lubricate the mechanism, a hole R is bored and tapped in the shell $C^2$ and provided with suitable plug, and the interior of the internal gear-case filled with oil or grease, which also serves to deaden the noise. The pinions $d$ are preferably made of bronze running on steel studs. Spiral oil-grooves are cut on the inside of these pinions and on the inside of the bronze bushings $c$ $c'$ $c^2$. At the base of occasional teeth in pinions $d$ and $d'$ are bored holes communicating with these oil-grooves. The meshing of the four gears therefore serves to produce a flow of oil or grease to the centers of the same, thereby effecting perfect lubrication. In the space between bushings $c'$ $c'$ an oil-hole is bored through sleeve E to effect lubrication between E and the bronze bushing $c^2$ on hub of $C^3$. On a level with the teeth of pinion $d'$ is bored an oil-hole through hub of $D'$, so that a stream of lubricant is caught by the spiral oil-grooves on bronze bushings $c$. Another oil-hole is bored through hub $C^4$ and bushing $c^3$ to lubricate the surfaces of bushing $c^3$ and frame $A^2$. The latter also has an oil-hole through it to lubricate the sliding collar K. In order to prevent waste of the lubricant, the space at the outer end of hub $D'$ is filled with a suitable packing. It is also important to prevent the waste oil or grease from leaking at the outer end of bushing $c^2$, as it would there get under friction device H and cause slipping and excessive heat. Bushing $c^2$ is therefore permitted to project beyond the outer hub of $c^5$, and surrounding it is placed a beveled bronze ring $L^2$, whose convex face engages a beveled concave face of ring $L'$, which is preferably made of soft antifriction metal. Three or more screws $L^3$ apply on the ring $L^2$ in holes bored for the purpose, so that $L^2$ can be forced forward to expand ring $L'$, and thus prevent leakage. The screws $L^3$ may be reached from the outside and set up when necessary. The waste oil that passes ring $L^2$ is carried off through holes $l'$ in hub of wheel F into the gear-case $A^3$, whose upper half $A^4$ is removable. The noise made by pinions $d$ $d'$ will indicate when the supply of lubricant needs replacing, as the mechanism is almost noiseless when properly filled. As the bushings $c$ $c'$ $c^2$ $c^3$ need occasional replacing, the axle B should be provided with removable wheels. To effect this, a wide but shallow groove $m$ $m$ is turned on axle B. Into this is slipped a beveled bronze bushing M M, cut into halves and planed down slightly on the edges for compression.

The wheel is put into place and four or more holes bored through the same, the holes starting at or near the meeting lines of wheel N (which has a corresponding taper bore) and bushing M. Into these holes the hook-bolts M' are inserted, the hook clasping the back of the bushings and the nuts of said bolts applying on washer m', which rests upon hub of wheel N. By then tightening the nuts the wheel is forced into its proper position and the bushings M clamped on the axle. The wheel can be easily removed when desired and then firmly replaced in exactly its former position. In order to prevent excessive production of heat or wear of surfaces when brake G or friction device H are allowed to slip, their inner surfaces are lined with vulcanized fiber bands $g$ $h$, which can be easily replaced when worn. It is evident that supplemental brake H can be mounted on wheel F and made to apply on the surface of C or $C^3$, if desired. Instead of brake or friction bands levers with friction-shoes may be used. It is also evident that the same result may be produced without an internal gear by replacing the internal gear C with a large gear keyed to the shaft B and shown in Fig. 10, in which it is marked D. The friction-wheel C is supported, as before, by the hubbed shells $C^2$ $C^3$, and these are loose on the shaft; but they carry the studs $d^3$, on which run the pinions $d$, meshing with sleeved pinions $d'$, and the pinions $d^2$, meshing with pinion D. It is evident that when pinion $d'$ is turned to the right and neither brake or friction device applied pinions $d$ and $d^2$, which are integral, will turn to the left and brake-wheel C' will turn to the left. When friction G is applied and C' is checked, pinion D and shaft B will be turned to the right at a double reduction and when friction device H is applied shaft B will be turned to the right at the ultimate speed of pinion $d'$. I have used the internal-gear arrangement, as it is simpler and more compact; but I do not limit myself to the use of the internal gear where the other would be preferable.

In Fig. 10 the reduction with brake G fully applied is ten to three. In Fig. 3 it is four to one, with two less gears.

The operating-screws G' of the first brake G are operated by levers $G^3$ and connecting-links $G^4$, leading to the brake-controlling mechanism. The levers $G^3$ $G^3$ are connected by connecting-link $G^5$, so that when power is communicated to either lever $G^3$ it will be communicated to the other lever $G^3$ by the connecting-link $G^5$. A coil-spring $G^6$, surrounding the connecting-link $G^5$, serves to release or throw off the brake. The lever $K^3$ for operating the friction-band H is actuated by a lever $K^7$, connected by a link $K^8$ with the lever $K^3$.

$K^9$ $K^9$ are the links leading from the lever $K^7$ to the controlling mechanism.

$K^{10}$ is a spring surrounding the link $K^8$ and which operates to release the brake.

By use of the words "single reduction" in the specification and claims I mean that the driver-gear is not linked, keyed, or coupled to the same shaft as the driven gear, but is connected to a second shaft that moves at a different number of revolutions, making thereby a single reduction of speed, the amount or extent of reduction effected by this first or single reduction being of course dependent upon the relative diameters of the gears. By "double reduction" I mean that an intervening shaft is between the driver-gear and driven gear, so that one reduction is made to reach the intermediate shaft and a second or further reduction to reach the driven gear, the amount or extent of speed reduction thus effected being of course dependent upon the relative diameters of the gears through which the motion is communicated from the driver to the intermediate shaft and thence from the intermediate shaft to the driven shaft. This is what I wish to be understood as meaning by a "single reduction" and by a "double reduction," and this is, as I understand, the general accepted meaning of "single reduction" and "double reduction" among mechanics generally and railway and other engineers.

I claim—

1. In a planet-gear mechanism, the combination with shaft B of disk D, secured to said shaft, planet-gears $d$ $d$ carried by said disk, sleeve E loose upon said shaft and having pinion $d'$ secured thereto and meshing with said planet-gears, internal gear C having friction-brake surface C' and a brake applicable thereto, a frame or support to which said brake is secured, supplemental friction-wheel F, and a supplemental friction device H mounted to revolve with said internal gear C, said internal gear C having a hollow shell $C^2$ $C^3$ furnished with bearing sleeves or hubs $C^4$ $C^5$, and means for operating said brake G and said supplemental friction device H, substantially as specified.

2. In a planet-gear mechanism, the combination with shaft B of disk D secured to said shaft, planet-gears $d$ $d$ carried by said disk, sleeve E loose upon said shaft and having pinion $d'$ secured thereto and meshing with said planet-gears, internal gear C having friction-brake surface C' and brake C applicable thereto, a frame or support to which said brake is secured, supplemental friction-wheel F, and supplemental brake device H mounted to revolve with said internal gear C, said internal gear C having a hollow shell $C^2$ $C^3$ furnished with bearing sleeves or hubs $C^4$ $C^5$, said disk having a sleeve or hub D', said sleeves or hubs $C^4$ $C^5$ fitting one upon said hub D', and one upon said sleeve E, and means for operating said brake G and supplemental friction device H, substantially as specified.

3. In a planet-gear mechanism, the combination with shaft B of disk D secured to said shaft, planet-gears $d$ $d$ carried by said disk, sleeve E loose upon said shaft and having pinion $d'$ secured thereto and meshing with said planet-gears, internal gear C having friction-brake surface $C'$ and a brake applicable thereto, a frame or support to which said brake is secured, supplemental friction-wheel F, and supplemental brake device H mounted to revolve with said internal gear C, said internal gear C having a hollow shell $C^2$ $C^3$ furnished with bearing sleeves or hubs $C^4$ $C^5$, said disk D having a sleeve or hub $D'$, said sleeves or hubs $C^4$ $C^5$ fitting one upon said hub $D'$, and one upon said sleeve E, bushings $c$ $c'$ at the bearings between said revolving parts, and means for operating said brake G and supplemental friction device H, substantially as specified.

HAROLD P. BROWN.

Witnesses:
GODFREY MORGAN,
J. J. SCHOENLEBER.